United States Patent
Tang

[19]

[11] Patent Number: 5,838,087
[45] Date of Patent: Nov. 17, 1998

[54] RELUCTANCE MACHINE

[75] Inventor: Yifan Tang, St. Louis, Mo.

[73] Assignee: Emerson Electric Co., St. Louis, Mo.

[21] Appl. No.: 705,792

[22] Filed: Aug. 30, 1996

[51] Int. Cl.$^6$ .......................... H02K 19/02; H02K 19/12
[52] U.S. Cl. ......................... 310/168; 310/166; 310/180; 310/162; 310/165; 318/701
[58] Field of Search ..................... 310/162, 166, 310/165, 168, 180, 184; 318/701

[56] References Cited

U.S. PATENT DOCUMENTS

| | | | |
|---|---|---|---|
| 4,442,368 | 4/1984 | Kupisiewicz et al. .................. | 310/162 |
| 5,010,267 | 4/1991 | Lipo et al. ............................. | 310/162 |
| 5,111,096 | 5/1992 | Horst ..................................... | 310/168 |
| 5,545,938 | 8/1996 | Mecrow ................................. | 310/156 |

FOREIGN PATENT DOCUMENTS 2 262 843  6/1993  United Kingdom ............. H02K 3/18

OTHER PUBLICATIONS

Li et al., "A Doubly Salient Permanent Magnet Motor Capable of Field Weakening," Univ. of Wisconsin–Madison, Dept. of Electrical and Computer Engineering, 1995.

B.C. Mecrow, "Fully Pitched–Winding Switched–Reluctance and Stepping–Motor Arrangements," Jan. 1993, IEE Proceedings–B.

P.G. Barrass, et al., "Bipolar Operation of Fully–Pitched Winding Switched Reluctance Drives," Sep. 11–13, 1995, IEE Conference Publication No. 412.

P.G. Barrass, et al., "The Unipolar Operation of Fully–Pitched Winding Switched Reluctance Drives," 1994, ICEM Conference Proceedings.

B.C. Mecrow, "New Winding Configurations for Doubly Salient Reluctance Machines," Oct., 1992, IEEE Industrial Applications Society.

Stephenson and Blake, "The Characteristics, Design and Applications of Switched Reluctance Motors and Drives," Jun. 1993, Nuremberg, Germany.

*Primary Examiner*—Nestor Ramirez
*Assistant Examiner*—B. Mullins
*Attorney, Agent, or Firm*—Arnold, White & Durkee

[57] ABSTRACT

A reluctance machine including a stator defining a plurality of stator poles and a plurality of stator slots, a rotor positioned to rotate with respect to the stator, and a plurality of phase windings, where each phase winding comprises a plurality of coils, where each coil is wound about more than one stator pole, where each coil comprises two coils sides, and where only one coil side is positioned in each stator slot, wherein the self-inductance of each phase winding varies as a function of the angular position of the rotor with respect to the stator. Also a reluctance machine similar to that described above where each of the phase windings is magnetic uni-polar.

9 Claims, 15 Drawing Sheets

RELUCTANCE MACHINE

FIELD OF THE INVENTION

The invention relates to reluctance machines, apparatus for driving reluctance machines, and methods for operating reluctance machines.

BACKGROUND OF THE INVENTION

Reluctance machines are well known in the art. In general, a reluctance machine is an electric machine in which torque is produced by the tendency of a movable part to move to a position where the inductance of an excited winding is maximized (i.e., the reluctance is minimized).

In one type of reluctance machine, the phase windings are energized at a controlled frequency. This type of reluctance machine is generally referred to as a synchronous reluctance machine. In another type of reluctance machine, circuitry is provided to determine the position of the machine's rotor, and the windings of a phase are energized as a function of rotor position. This type of reluctance machine is generally referred to as a switched reluctance machine. Although the description of the current invention is in the context of a switched reluctance machine, the present invention is applicable to all forms of reluctance machines, including synchronous and switched reluctance motors and to other machines that have phase winding arrangements similar to those of switched reluctance machines.

The general theory of design and operation of switched reluctance machines is well known and discussed, for example in "The Characteristics, Design and Applications of Switched Reluctance Motors and Drives," by Stephenson and Blake and presented at the PCIM '93 Conference and Exhibition at Nuremberg, Germany, Jun. 21–24, 1993.

In general, reluctance machines have been designed with a stator yoke having inward projecting salient poles and a hollow core area. Nested concentricity in the hollow core area, or stator bore, is a rotor having outwardly projecting salient poles. Typically, the rotor contains no circuitry or permanent magnets. The rotor and the stator are coaxial. The rotor is connected to a rotor shaft which is free to rotate and acts as an output shaft when the machine is motoring, and as an input shaft when the machine is generating.

Typically, a single coil of wire is wound around each stator pole. The stator poles which are positioned opposite one another are generally coupled to form a single phase. A phase is energized by delivering current to the coil. Switching devices are generally provided which allow the coil to be alternately connected into a circuit which delivers current to the coil when the phase is energized and one which separates the coil from a current source when the phase is de-energized, and which may recover energy remaining in the winding.

Reluctance torque is developed in a reluctance machine by energizing a pair of stator poles when a pair of rotor poles is in a position of misalignment with the energized stator poles. The degree of misalignment between the stator poles and the rotor poles is called the phase angle. Energizing a pair of stator poles creates a magnetic north and south in the stator pole pair. Because the pair of rotor poles is misaligned with the energized stator poles by some phase angle, the inductance of the stator and rotor is less than maximum. The pair of rotor poles will tend to move to a position of maximum inductance with the energized windings. The position of maximum inductance occurs where the rotor and stator poles are aligned.

In traditional reluctance machines where each phase winding is comprised of coils and where each coil surrounds only a single stator pole, all of the torque produced by the machine is derived from changes in the self-inductance of each of the phase windings. In an effort to improve the performance of reluctance machines, and in an effort to increase the torque capabilities of reluctance machines, designs have been proposed in which "fully-pitched" coils are used to form the various phase windings. In these designs, the coils comprising the phase windings are "fully-pitched" in the sense that each coils surrounds a number of stator poles, where the number of stator poles surrounded by each coil is equal to an integer multiple of the number of phases. In these designs, torque is produced as a function of the mutual-inductances between the various phase windings. It has been suggested that these traditional fully-pitched machines utilize the active material of the reluctance machine more efficiently than do machines with concentrated (e.g., single pole coil) machines.

FIGS. 1A and 1B illustrate various aspects of a conventional "fully-pitched" reluctance machine 10. This machine is similar to the fully-pitched reluctance machine described in U.S. Pat. No. 5,545,938 to Mecrow.

Turning to FIG. 1A, a conventional fully-pitched reluctance machine 10 is illustrated. The machine 10 includes a stator 11 defining six inwardly extending stator poles 13 and a rotor 12 defining four outwardly projecting rotor poles. Placed within the stator 11 are a number of coils of conductive material that are coupled together to form three phase windings A, B and C. In the example of FIG. 1A, each of the phase windings A, B and C comprises a single coil and each coil comprises two coil sides. Each of the phase windings is fully-pitched in the sense that each coil comprising the phase winding encircles three stator poles.

The placement of the coils in FIG. 1A is reflected by the + and − indications adjacent to the coil sides. For example, coil A includes a number of axially extending turns in slot 14 (identified as $A_1+$) and a number of axially extending turns in slot 15 (identified as $A_1-$). The + identifier for the axially extending turns in slot 14 indicates that positive electrical current in phase A will flow in the direction that would be "out of the page," and the − identifier for the axially extending turns in slot 15 indicates that positive electric current in phase A will flow "into" the page. Similar positive and negative identifiers are used with the other coils.

FIG. 1B provides indications $L_A$, $L_B$ and $L_C$ of the self-inductances for the three phase windings A, B and C as a function of the rotor's position and indications of the mutual-inductances $M_{AB}$, $M_{BC}$ and $M_{CA}$ between the three phase windings as a function of rotor position.

An analysis of FIGS. 1A and 1B reveals that conventional fully-pitched winding machines, such as a machine 10, are limited in a number of respects. First, as the $L_A$, $L_B$ and $L_C$ indications reflect, the self-inductances of the three phase windings A, B and C of machine 10 are always constant and are always relatively high. Because the rate at which current can change in a winding is inversely proportional to the inductance of the winding, the relatively constant, high self-inductance of the phase windings in conventional fully-pitched reluctance machines limits the rate in which current in the windings can change. This limitation, thus, limits the current available to the windings in the torque producing regions for the windings and, therefore, limits the torque capability of such machines. Slow current commutation also may result in phase negative torque, reducing torque capability and increasing the amount of torque ripple. This limitation also restricts the speed at which current can occur in such motors and, therefore, the overall operating speed of the machine. As such, machines such as machine 10 typically have relatively low maximum operating speeds. Further, the nature of the magnetic fields established by the phase windings in machines such as machine 10 limits the potential efficiency and torque density of the machine because in such machines a substantial amount of non-torque producing (or even negative torque producing) flux often leaks through the stator poles adjacent to the current carrying slots.

It is an object of the present invention to provide an improved reluctance machine that overcomes the above described limitations of traditional reluctance machines and conventional fully-pitched reluctance machines and to provide a reluctance machine, apparatus for operating such a machine, and methods for operating such a machine that provide for relatively fast current commutation; relatively high speed operation; good efficiency; and relatively high torque and power densities.

SUMMARY OF THE INVENTION

The present invention relates to an improved reluctance machine.

In accordance with one aspect of the present invention a reluctance machine is provided that comprises a stator defining a plurality of stator poles and a plurality of stator slots, a rotor positioned to rotate with respect to the stator, and a plurality of phase windings, where each phase winding comprises a plurality of coils, where each coil is wound about more than one stator pole, where each coil comprises two coils sides, and where only one coil side is positioned in each stator slot, wherein the self-inductance of each phase winding varies as a function of the angular position of the rotor with respect to the stator. According to one method of the present invention, a machine like that described above is operated such that the current in at least one phase winding is commutated at the point where the self-inductance of that phase winding reaches its minimum value.

In accordance with another aspect of the present invention a reluctance machine is provided that comprises a stator defining a plurality of stator poles and a plurality of stator slots, a rotor positioned to rotate with respect to the stator and a plurality of phase windings, where each phase winding comprises a plurality of coils, where each coil is wound about more than one stator pole, where each coil comprises two coils sides, and where only one coil side is positioned in each stator slot, wherein energization of a given phase winding establishes two parallel flux paths in the machine, wherein the two parallel flux paths reinforce each others magnet-motive forces.

In accordance with yet another aspect of the present invention a reluctance machine is provided that comprises a stator defining a plurality of stator poles and a plurality of stator slots, a rotor positioned to rotate with respect to the stator, a plurality of phase windings, where each phase winding comprises a plurality of coils, where each coil is wound about more than one stator pole, where each coil comprises two coils sides, and where only one coil side is positioned in each stator slot, wherein each of the phase windings is magnetic uni-polar. Specific embodiments of this aspect of the present invention include embodiments where all of the coils are fully-pitched and embodiments where the phase windings are arranged such that the mutual-inductances between the various phase windings are symmetric.

Other aspects and advantages of the present invention will become apparent upon reading the following detailed description and upon reference to the drawings.

DETAILED DESCRIPTION OF THE INVENTION

Figures 1A, 1B:
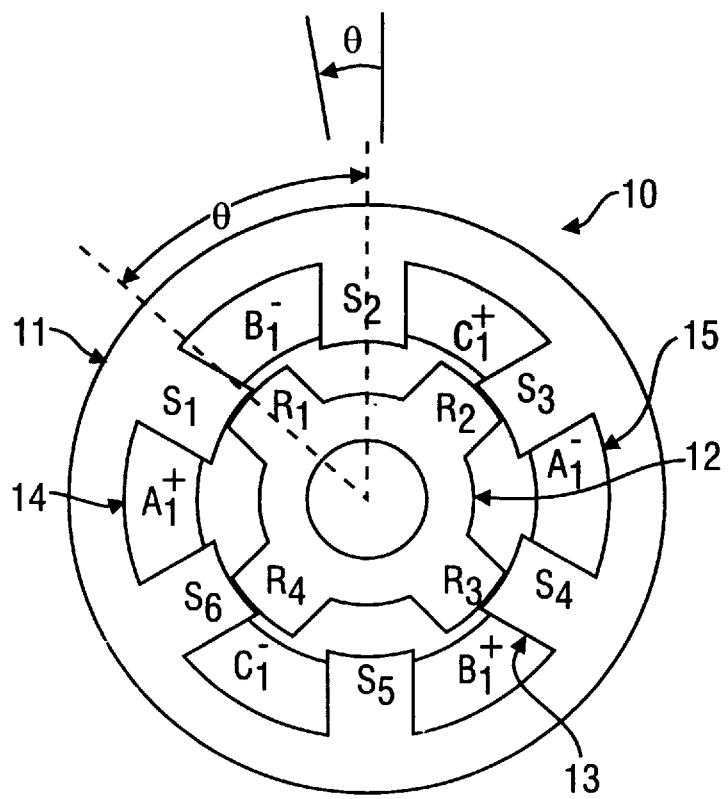
FIGS. 1A and 1B illustrate a conventional fully-pitched reluctance machine.
Figure 2A:
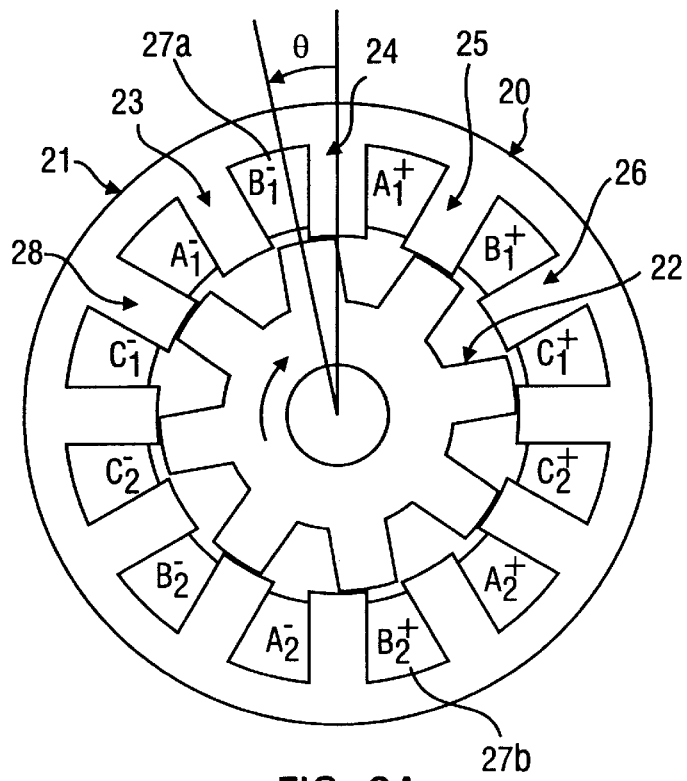
FIGS. 2A–2E illustrate an exemplary embodiment of a reluctance machine in accordance with the present invention and exemplary energization schemes for such a machine.

Turning to the drawings and, in particular, to FIGS. 2A, a reluctance machine 20 in accordance with one aspect of the present invention is shown. In general, the reluctance machine 20 includes a stator 21 and a rotor 22 where the self-inductances and mutual-inductances between the phase windings both vary as a function of the rotor's position.

The stator 21 may be constructed in a conventional manner from a stack of substantially identical laminations. In the exemplary embodiment of FIG. 2A, the stator 21 defines twelve inwardly projecting stator poles and twelve inter-pole "stator slots." It will be appreciated by those of ordinary skill in the art that the selection of twelve as the number of poles in the described embodiment is for illustrative purposes only and that the number of poles can be varied without departing from the teachings of this specification.

Positioned with a central bore defined by the projecting stator poles is rotor 22. The rotor is positioned to rotate with respect to the stator. Rotor 22 may be constructed in a conventional manner from a stack of substantially identical laminations. In the example of FIG. 2A, the rotor 22 defines eight outwardly extending rotor poles although a different number of rotor poles may be provided for without departing from the present invention.

Positioned within the slots defined by the inwardly projecting stator poles are a plurality of please windings where each phase winding comprises a plurality of coils and where each coil comprises two coil sides. Only one coil side is positioned within each of the stator slots.

Figure 7A:
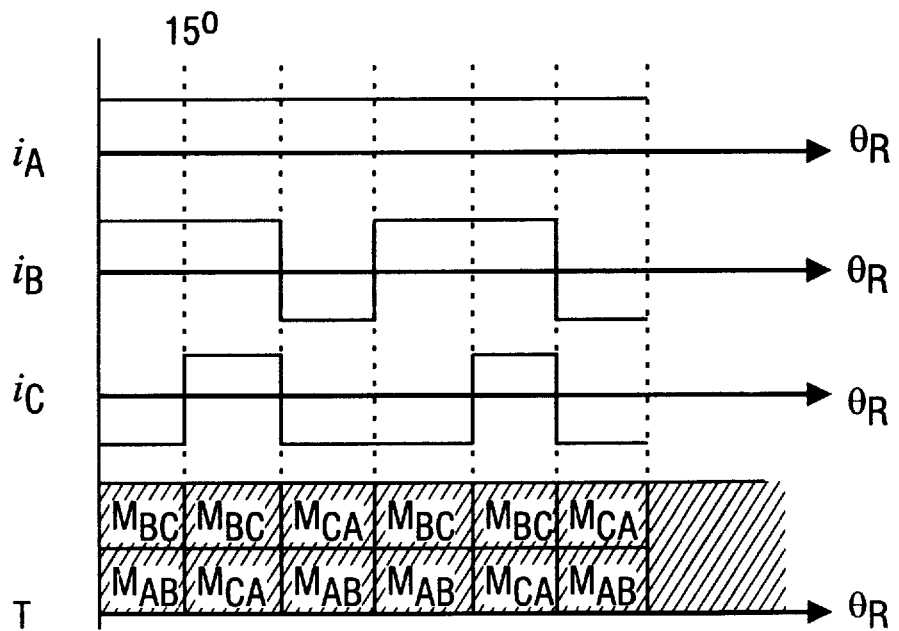
FIGS. 7A and 7B illustrate exemplary energization schemes for the machine of FIG. 5A.

In the exemplary embodiment of FIG. 7A there are three phase windings A, B and C. Each of the three phase windings comprises two winding coils, A1 and A2 for phase A, B1 and B2 for phase B, and C1 and C2 for phase C, where each comprises two coil sides, and only one coil side is positioned within each stator slot. Each of the winding coils for phases A and B in the example of FIG. 2A spans two stator poles, and there is one stator pole "common" to the coils of phases A and B. For example, coil A1 spans stator pole 23 and 24 and coil B1 spans stator poles 24 and 25. Thus, stator pole 24 is "common" to coils A1 and B1. A similar arrangement exists with respect to coils A2 and B2.

The specific winding arrangement of the coils for phases A and B reflected in FIG. 2A is exemplary only. Other winding schemes, where the coils span different numbers of stator poles are envisioned without departing from the present invention. In general, however, for a reluctance machine having N phases, N being an integer, there may be N−1 phase windings, where each phase winding includes coils wound about N−1 stator poles.

The coils C1 and C2 are wound in a manner that is different from that of coils A1, A2, B1 and B2. Specifically, each of the coils C1 and C2 spans five stator poles such that coil C1 spans stator poles 28, 23, 24, 25 and 26. Coil C2 spans five similarly situated poles on the opposite side of the stator. Thus for winding C, there are at least two adjacent stator slots that carry current from coil sides of the same phase winding.

The specific winding configuration used for the phase C winding in FIG. 2A is exemplary only and other configurations are envisioned. In general, however, implementation of the winding configuration of FIG. 2A will utilize at least one phase winding including coils wound about 2N−1 stator poles, where N is an integer number equal to the number of phases.

The placement of each of the coils A1, A2, B1, B2, C1 and C2 is such that when positive current is flowing through the phase windings, opposing electro-magnets having the same magnetic alignment are established. For example, using the same + and − convention previously described, when positive electric current flows through phase winding A, a first electro-magnet will be established having a magnetic center near the center of slot 27a and a second electro-magnet having a magnetic center near the center of slot 27b will be established. Because of the placements of coils A1 and A2, the magnetic orientations of these two electromagnets will be the same. In other words, the machine 20 is, for each phase "magnetic uni-polar." As reflected in FIG. 2A, the winding arrangement for phases B and C are similar to that for phase A in that they are both magnetic uni-polar.

The fact that the machine 20 is magnetic uni-polar is significant, in that, for each energized phase winding, a concentrated flux path is established that tends to pass through the energized coils and the spanned stator poles (and producing efficient torque) as opposed to leaking through the other stator poles. This aspect of machine 20 is illustrated generally by FIG. 2B and 2C.

Figure 2B:
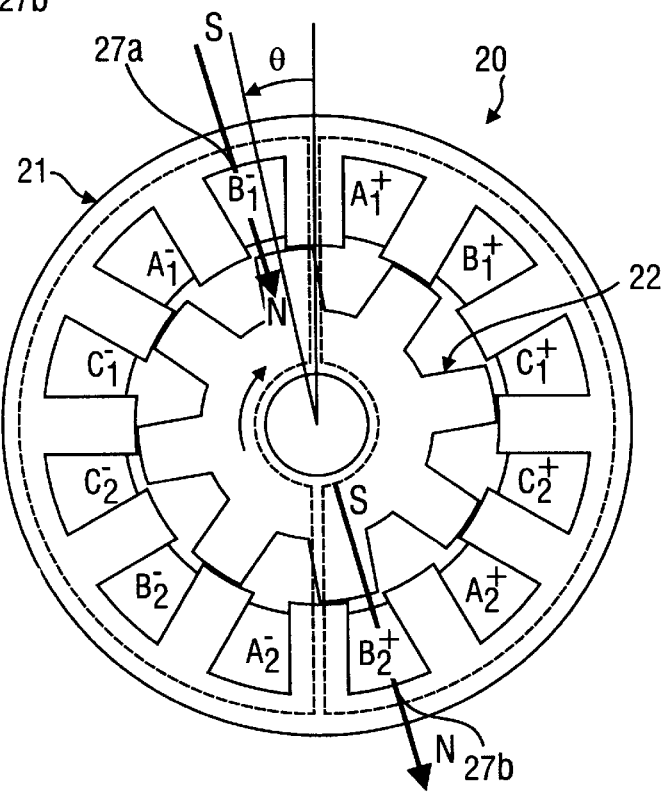

FIG. 2B illustrates generally the alignment of the magnetic field that is established in machine 20 as a result of the energization of phase winding A. As reflected, the energization of phase A results in the establishment of a single (i.e., uni-polar) magnetic field having a north and south magnetic poles corresponding generally to the arrow in FIG. 2B. As the arrow indicates, the magneto-motive force (MMF) established by coil A1 tends to reinforce the MMF established by coil A2 while discouraging, by magnetic opposition, flux flow through non-spanned coils.

Because of the reinforcing nature of the MMFs of coils A1 and A2 and because of the uni-polar nature of the machine, two parallel flux paths exist when phase A is energized. These flux paths are reflected generally by the dashed lines in FIG. 2B. As reflected in the figure, the established and reinforced flux paths follow a path where the total length of the air-gap through which the flux flows is minimized. Accordingly, the majority of the flux flows through iron-intensive paths which have a much lower reluctance than air-intensive paths. As such, the machine 20 requires less total MMF to establish the same flux level than would be required for a conventional machine. Thus, the flux flow established by the machine of the present invention provides for maximum machine efficiency and performance and minimizes stray flux leakage which tends to degrade machine performance.

As the winding arrangement for phase B is similar to that of phase A, the magnetic fields and flux paths established when phase B is energized are like that for phase A and are not, therefore, reflected in a separate figure. The magnetic fields and flux paths for phase B will be apparent to one of ordinary skill in the art having the benefit of this disclosure. Thus, as reflected in FIG. 2B, energization of either phases A and B of machine 40, establishes two parallel flux paths in the machine, wherein the two parallel flux paths reinforce each others magnet-motive forces.

Figure 2C:
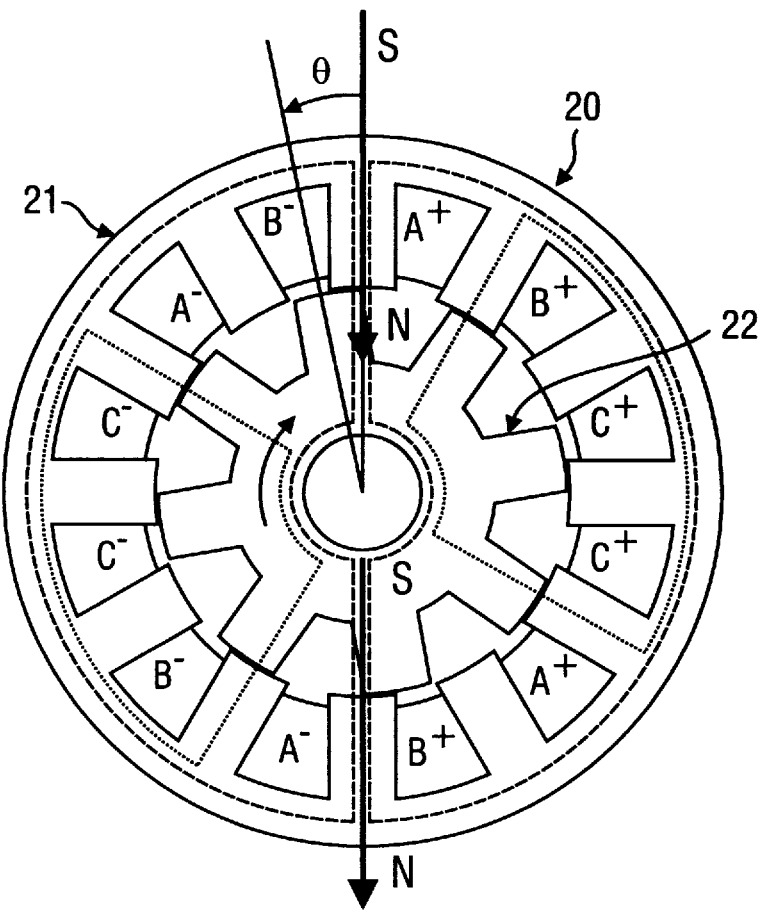
Figure 2D:
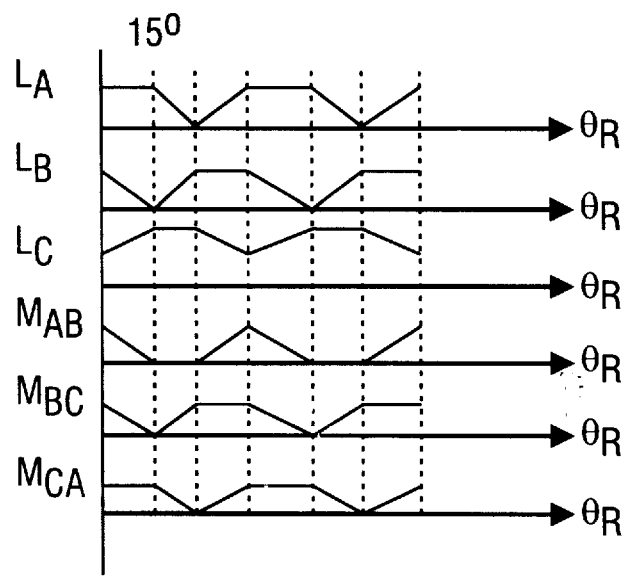

The magnetic fields and flux paths established when phase C is energized are reflected in FIG. 2C. As reflected in the figures, the energization of phase C results in the establishment of a uni-polar magnetic field in machine 20 and in the establishment of two parallel flux paths, as does the energization of phases A and B. The primary differences between the flux paths established when phases A and B are energized and when phase C is energized are that the magneto-motive force ("MMF") for phase C tends to have its center aligned with two diametrically opposed stator poles while the MMF for phases A and B tends to have its center aligned in the vicinity of two adjacent stator poles. Thus, the flux paths established when phase C is energized tend to pass through more overlapped rotor poles than the flux paths established when either or both of phases A and B are energized which tends to pass through two partially overlapping rotor poles. FIGS. 2D illustrates the self-inductances for phases A, B and C for machine 20 ($L_A$, $L_B$, $L_C$) and the mutual-inductances between phases AB, BC and CA ($M_{AB}$, $M_{BC}$, $M_{CA}$) as a function of rotor position. As the self and mutual-inductance curves indicate, the self and mutual-inductances for and between the three phase windings are not constant, but vary as a function of the angular position of the rotor with respect to the stator. Moreover, the mutual-inductances between any two phase windings are all positive, i.e., greater than or equal to zero for all rotor positions.

For phases A and B, the self-inductances are reduced to a minimum at the rotor positions where there is no overlap between the stator poles spanned by the coils of the respective phases and the rotor poles. The self-inductance plot for phase C is different from that of phases A and B and reaches a peak value at the rotor positions where (in the top or bottom half of the flux path) two out of the five stator poles spanned by each of the coils of phase C are aligned with two rotor poles. Further, the self-inductance of phase C tends to remain at its peak value as long as the total length of the stator poles spanned by phase C that overlap with the rotor poles is approximately equal to the combined length of two rotor poles. This is true for both the top and the bottom half of the flux path.

Figure 2E:
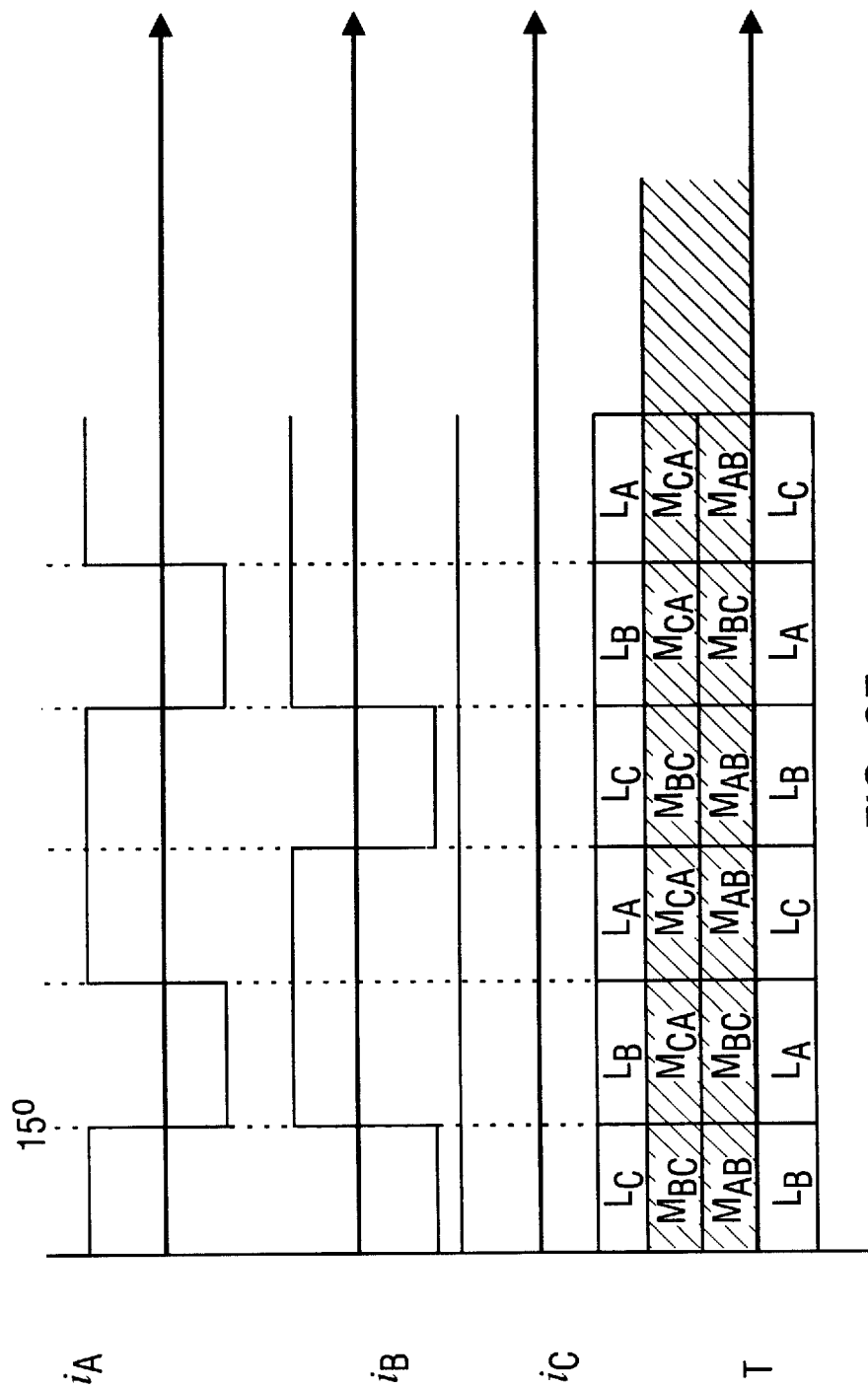

Because the self-inductances of and the mutual-inductances between the phase windings A, B and C vary as a function of the rotor's position, output torque can be produced as a function of both the self-inductance and mutual-inductance variations. FIG. 2E illustrates one exemplary energization scheme that may be used with the reluctance machine 20 of FIG. 2A.

FIG. 2E illustrates an example of an energization scheme for machine 20 including desired exciting phase currents for the three phase windings A, B and C and the resultant self-inductance and mutual-inductance torques produced when such currents are applied to the phase windings of machine 20. The phase currents for phases A and B are substantially identical but phase shifted with respect to one another by an amount equal to approximately one stator pole pitch. The phase current for phase winding C is illustrated as being substantially constant. The substantially constant phase C current is desirable since the relatively high self-inductance of phase C at all rotor positions would make relatively fast current switching and current commutation difficult. The phase currents may be provided to the machine 20 by suitable drive circuitry which may be constructed by one of ordinary skill in the art having the benefit of this disclosure.

The total torque output of machine 20 may be mathematically expressed by the equation:

$$\tau = \frac{1}{2} i_A^2 \frac{\partial L_A}{\partial \theta_R} + \frac{1}{2} i_B^2 \frac{\partial L_B}{\partial \theta_R} + \frac{1}{2} i_C^2 \frac{\partial L_C}{\partial \theta_R} +$$

$$i_A i_B \frac{\partial M_{AB}}{\partial \theta_R} + i_B i_C \frac{\partial M_{BC}}{\partial \theta_R} + i_C i_A \frac{\partial M_{CA}}{\partial \theta_R}$$

Applying the equation set forth above to the current and inductance curves of FIG. 2E, it may be noted that the total torque output for any given rotor position will include: (i) a positive self-inductance torque from a first phase winding; (ii) a negative self-inductance torque from a second phase winding which essentially cancels the torque produced by the change in the self-inductance of the first phase winding; (iii) a first positive mutual-inductance torque component resulting from the change in the mutual-inductance between two phase windings; and (iv) a second positive mutual-inductance torque component resulting from the change in the mutual-inductance between two phase winding. Positive self-inductance torque will be produced when there is current of either polarity in a given phase winding and the polarity of the slope of the self-inductance waveform at a given rotor position is positive (i.e., when the self-inductance is increasing). Negative self-inductance torque for a given winding will be produced when there is current of either polarity in a given phase winding and the slope of the self-inductance waveform at a given rotor position is negative (i.e., when the self-inductance is decreasing).

As a review of the self-inductance torques indicates, for each rotor position, the positive self-inductance torque resulting from one of the phase windings is canceled by the negative self-inductance torque of another phase winding. As such, the overall net torque results from the changes in the mutual-inductances of the phase windings and the total net-positive torque output is equal to the summation of the two mutual-inductance torque components. Moreover, because of the nature and placement of the phase windings in reluctance machine 20 and because of the energization sequence of FIG. 2E, all of the mutual-inductance torques are positive. This is reflected in the torque listings in FIG. 2E.

For example, between the rotor position corresponding to 0 and 15 degrees, there is: (i) a positive self-inductance torque contribution caused by the change in the self-inductance of phase C; (ii) a negative self-inductance torque contribution caused by the change in the self-inductance of phase B; (iii) a first positive mutual-inductance torque contribution caused by the change in the mutual-inductance between phases B and C; and (iv) a second positive mutual-inductance torque contribution caused by the change in the mutual-inductance between phases A and B. The net positive output torque produced over this interval is reflected by the appropriately shaded portion of FIG. 2E.

In general, for the machine 20 of FIG. 2A and 2B operating according to the energization scheme of FIG. 2E, the variable self-inductance for a given phase will produce either positive or negative torque when there is current in the phase winding. Negative self-inductance torque will be produced when self-inductance for the phase winding is decreasing and positive self-inductance torque will be produced when the self-inductance for the phase winding is increasing. However, for each given rotor position, the winding of machine 20 and the energization scheme of FIG. 2E is such that the positive self-inductance torque from one phase winding cancels the negative self-inductance output torque of another phase winding such that the net result of the self-inductance torques does not significantly contribute or affect the overall positive torque output which is primarily derived from the variable mutual-inductances of machine 20.

As the above indicates, the reluctance machine 20 of FIGS. 2A and 2B and the energization scheme of FIG. 2B provide for a reluctance machine 20 that has variable self-inductances such that relatively fast current commutation may occur and such that relatively high rotational speeds may be obtained. In particular, the self-inductances of the phase windings A and B of machine 20 are brought down to facilitate fast current commutation at particular rotor positions. The energization scheme of FIG. 2E takes advantage of the low self-inductance points. In this energization scheme continuous energization current is applied to the phase C winding.

One of the most critical points in the operation of a reluctance machine is the point, for each phase winding, where the phase current is "ramped-up" or brought from a relatively low value to a relatively high positive value. In general, at a certain operational speed, the speed at which this ramp-up can occur to a large extent depends on the self-inductance of the phase winding in which the current is flowing. As FIG. 2D indicates, for each of the three phase windings there are a number of rotor positions for which the self-inductance of that phase winding is minimized. For example, the self-inductance of phase A is minimized at rotor positions corresponding to 30 and 75 degrees and the self-inductance of phase B is minimized at rotor positions corresponding to 15 and 60 degrees. Referring to FIG. 2E, it may be noted that the points at which the current in phases A and B are ramped-up correspond to these minimum inductance points. Thus, the energization scheme of FIG. 2E takes advantage of the minimum inductance rotor positions of the phase windings of machine 20 to minimize the time required for current ramp-up and current commutation and thus to increase maximum torque capability and the maximum operating speed of reluctance machine 20 for a specific torque. Thus, according to the energizing scheme of FIG. 2E, a method of energizing machine 20 including the step of commutating the current in at least one phase winding at the point where the self-inductance of that please winding reaches its minimum value is provided.

Figure 3:
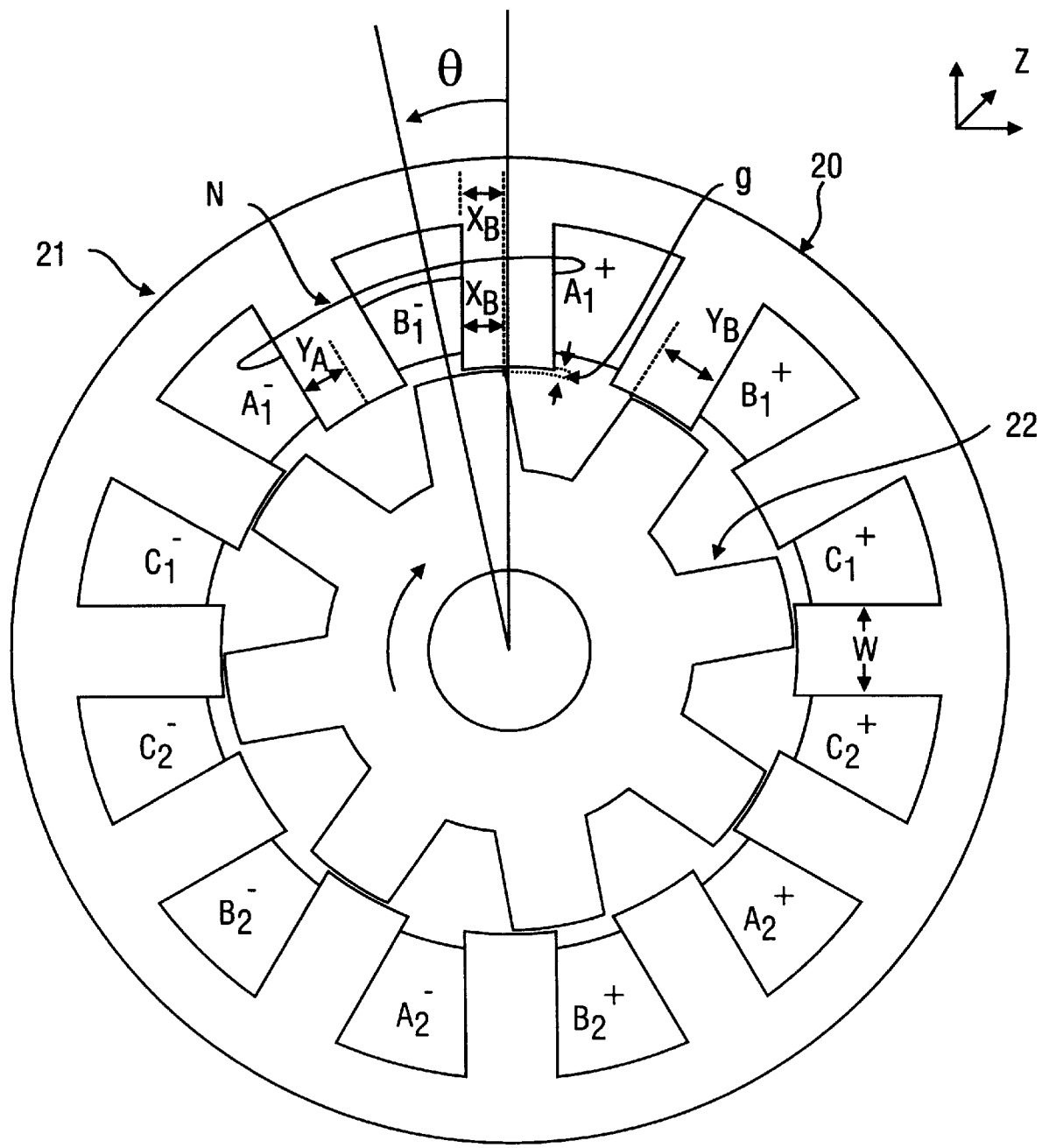
FIG. 3 illustrates a labeled example of a machine constructed in accordance with the present invention that is useful in deriving a mathematical model of the exemplary machine of FIGS. 2A–2E.

FIG. 3 provides an illustration of machine 20 that may be used to express mathematically the self- and mutual-inductances of the phase windings and the torque output of the machine using the idealized current waveforms of FIG. 2E. Specifically, FIG. 3 illustrates machine 20 with labeling added to identify various characteristics of the machine. In particular, FIG. 3 has been labeled to identify: (i) N—the number of turns of wire used to construct the coils comprising the phase windings; (ii) g—the air-gap length; (iii) z—the axial length of the stator core (and the rotor core assuming the rotor and stator cores have the same length); (iv) W—the width of the rotor and stator poles (it is assumed in this example that the widths are the same); (v) Xa, Xb—the amount of overlap between a rotor pole and a first one of the two stator poles encircled by a phase winding; and (vii) Ya, Yb—the amount of overlap between a rotor pole and the second one of the two stator poles encircled by a given phase winding.

Neglecting stray and leakage inductances and assuming magnetic linearity, equal slot fill and the idealized current waveforms of FIG. 2E, the self-inductances for phase windings A, B and C may be expressed mathematically as follows:

$$L_A = \frac{\mu_o N^2 Z}{2g} (X_A + Y_A), L_B =$$

$$\frac{\mu_o N^2 Z}{2g} (X_B + Y_B), L_C = \frac{\mu_o N^2 Z}{2g} (W + Y_A + Y_B)$$

Given the same set of conditions the mutual-inductance between the phase windings may be expressed as:

$$M_{AB} = \frac{\mu_o N^2 Z}{2g} X_A$$

$$M_{BC} = L_B = \frac{\mu_o N^2 Z}{2g} (X_B + Y_B)$$

$$M_{CA} = L_A = \frac{\mu_o N^2 Z}{2g} (X_A + Y_A)$$

From the above, it may be shown that the maximum self-inductance for phase A is equal to the maximum self-inductance for phase B which is equal to the maximum mutual-inductance between phases AB, BC and CA which is equal to:

$$\text{Max}(L_A) = \text{Max}(L_B) = \text{Max}(M_{AB}) =$$

$$\text{Max}(M_{BC}) = \text{Max}(M_{CA}) = \frac{\mu_o N^2 Z}{2g} W$$

Similarly it may be shown that the minimum inductances for the identified self- and mutual-inductance is 0.

Along the same lines, it may be shown that the maximum and minimum inductances for phase C are:

$$\text{Max}(L_C) = \frac{\mu_o N^2 Z}{g} W$$

$$\text{Min}(L_C) = \frac{\mu_o N^2 Z}{2g} W$$

Using the above equations, it may be shown that the total torque output of the machine may be derived as follows:

$$T = \frac{\mu_o N^2 Z W}{2g} \cdot \frac{24}{\pi} i_o^2$$

where $i_o$ is the peak magnitude of the energizing currents. This value of total torque output is approximately four times greater than the output that would be associated with a conventional reluctance machine and, adjusting for non-linearities and other practicalities, the machine 20 of the present invention can provide a torque output that is approximately twice that available from conventional machines of the same machine size and slot fill.

The substantial improvement in torque density available from the reluctance machine of the present invention is due to the utilization of more of the active material (e.g., iron) than is possible with conventional reluctance machines. For this same reason, the efficiency of a machine constructed according to the teachings contained herein will tend to be more efficient that a conventional reluctance machine. Because of this increased torque output and efficiency, for a given torque output, the magnitude of the current required to produce the given torque will be less for a machine constructed according to the present invention than would be required for a conventional reluctance machine. This diminished current requirement allows for the use of a lower-rated, and less costly, power converter/inverter, thus allowing more economical reluctance machine systems. The required cost for a drive that may be used with a machine constructed in accordance with the embodiment of the present invention reflected in FIGS. 2A–2E is even further reduced since phase C is energized with DC current only, thus reducing the required number of power switching devices.

Figure 4A:
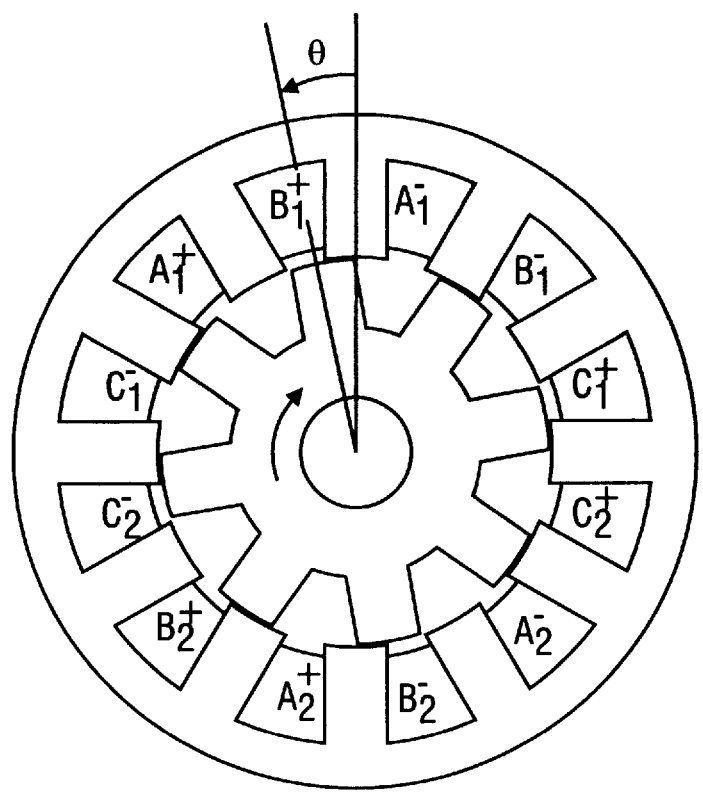
FIGS. 4A–4D illustrate an alternate embodiment of a machine constructed according to certain aspects of the present invention, the mutual and self-inductances for such a machine and exemplary energization schemes for such a machine.
Figure 4B:
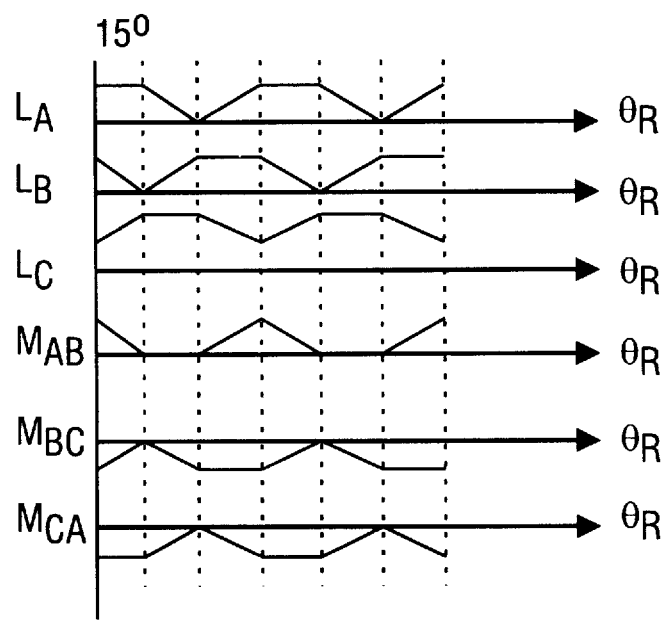

Referring to Figure FIGS. 4A illustrate an alternate embodiment of machine 20 in which the coils for phases A and B are placed within the stator such that the MMFs produced when phases A and B are energized are opposite those produced when the phase windings of machine 20 are energized. Because of this reversal of the coils of phases A and B, the mutual-inductances between any two phase windings may not be all positive as reflected in the self- and mutual-inductances waveforms provided in FIG. 4B. Thus, for the machine of FIG. 4A, the mutual-inductances between a first pair of phase windings (e.g., phases A and B) are greater than or equal to zero for all rotor positions and the mutual inductances between a second pair of phase windings (e.g, phases B and C) are less than or equal to zero for all rotor positions.

Figure 4C:
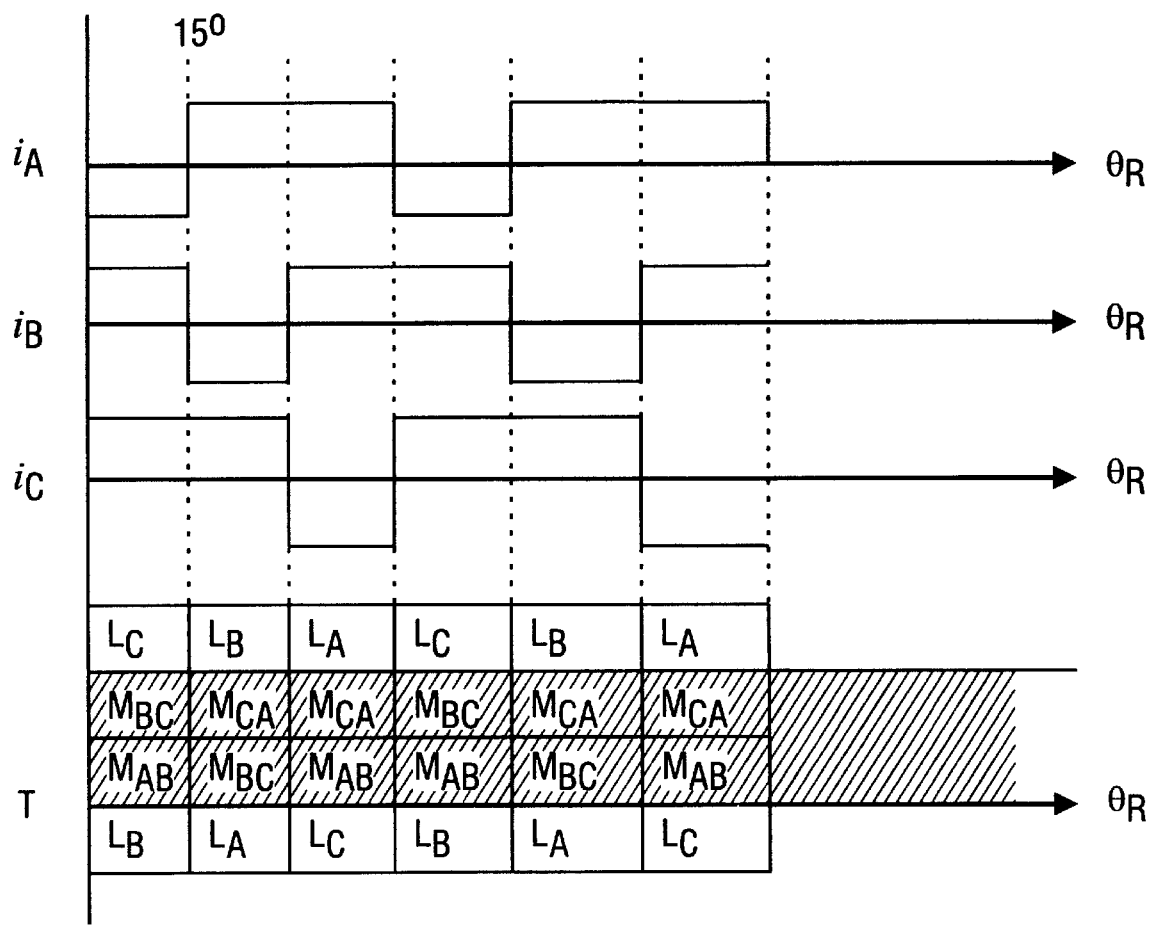
Figure 4D:
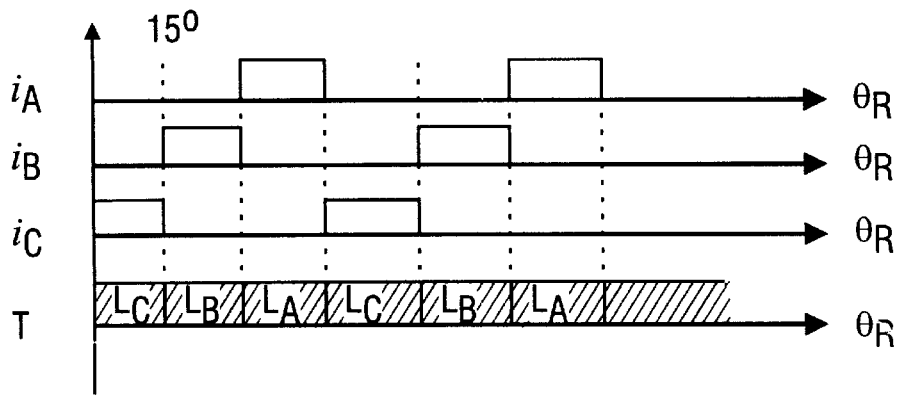

Because of the symmetric nature of the self- and mutual-inductances for the machine of FIG. 4A, symmetric energization currents may be used to energize the machine. FIG. 4C illustrates an exemplary energization scheme (and the resulting torque output) for a bi-polar energization scheme and FIG. 4D provides similar information for a uni-polar energization scheme.

Figure 5A:
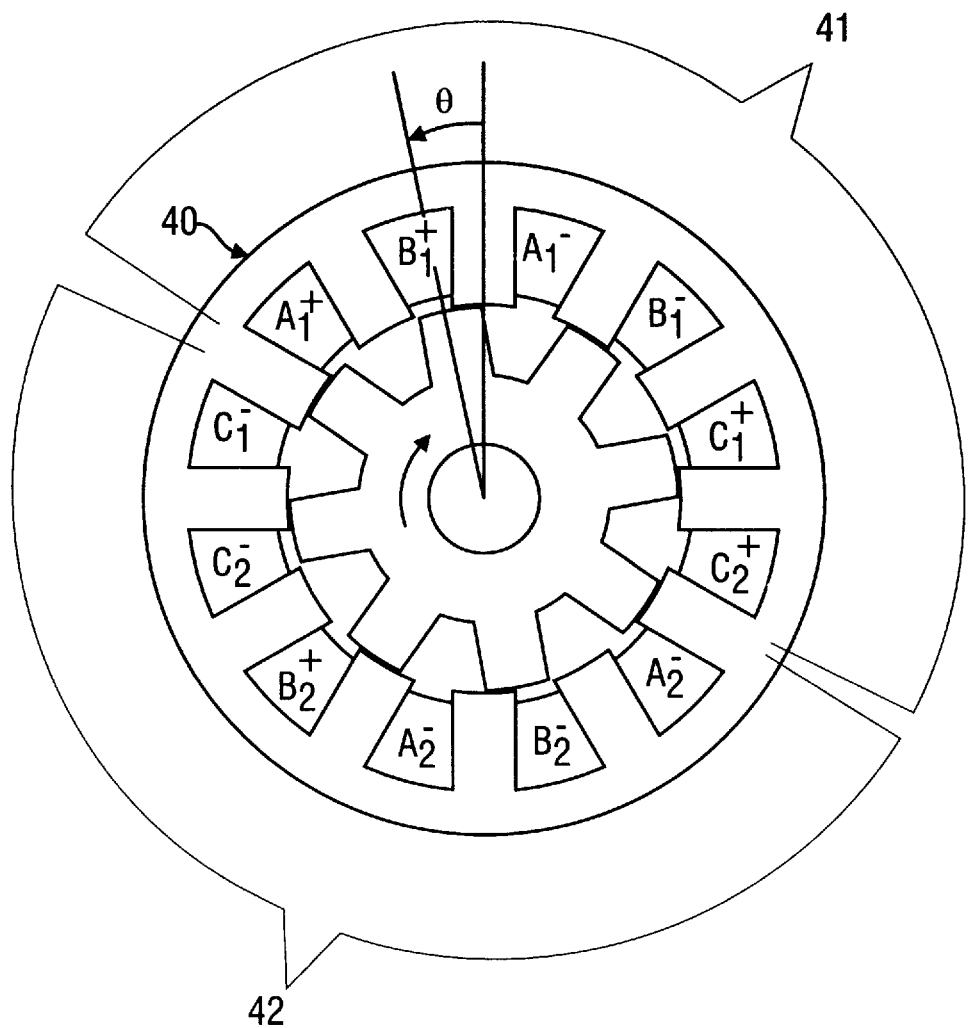
FIGS. 5A–5C illustrate an alternate embodiment of the present invention where the self-inductances of the phase windings do not significantly change as the angular position of the rotor with respect to the stator changes.

FIG. 5A illustrates another exemplary reluctance machine in accordance with one aspect of the present invention in which flux concentration techniques are used to reduce the overall air-gap length the flux needs to travel while enhancing flux-mutual coupling. This embodiment of the present invention utilizes fully-pitched winding coils but is different from known fully-pitched machines because, for example, the winding coils are placed in the stator in such a manner that the machine has a magnetic uni-polar structure for each phase winding.

Turning to FIG. 5A, a three phase, twelve stator pole, eight rotor pole reluctance machine 40 is illustrated. Each of three phase windings A, B and C, comprises two fully-pitched winding coils. Each of the winding coils is fully-pitched in the sense that each of the coils encircles three stator poles and there are three phases in the exemplary machine 40 of FIG. 5A. As before, the coils are illustrated such that the + side of the coil represents a configuration where positive current flows in a direction out of the page and the − side of the coil represents a configuration where positive electric current flows into the page.

As reflected in FIG. 4, the phase windings A, B and C are configured such that there is a first group, labeled 41, of adjacent stator slots for which positive electric current applied to the coil sides positioned in the first group of stator slots flows in a first direction and a second group of adjacent stator slots, labeled 42, for which positive electric current applied to the coil sides positioned in the second group of stator slots flows in a second direction, wherein the first direction is opposite the second direction. This particular arrangement of the coils and phase winding contributes to the efficient operation of machine 40. This characteristic of machine 40 is also a characteristic of machine 20 of FIG. 2A.

In the exemplary machine 40 of FIG. 4, both the first and second groups of adjacent stator slots include six stator slots. The exact number of slots for such a groups is not critical for purposes of the present invention and may vary from embodiment to embodiment. In general, however, for a reluctance machine having Y stator slots, the configuration of FIG. 5A will result in two groups of Y/2 slots where Y is an integer.

Figure 5B:
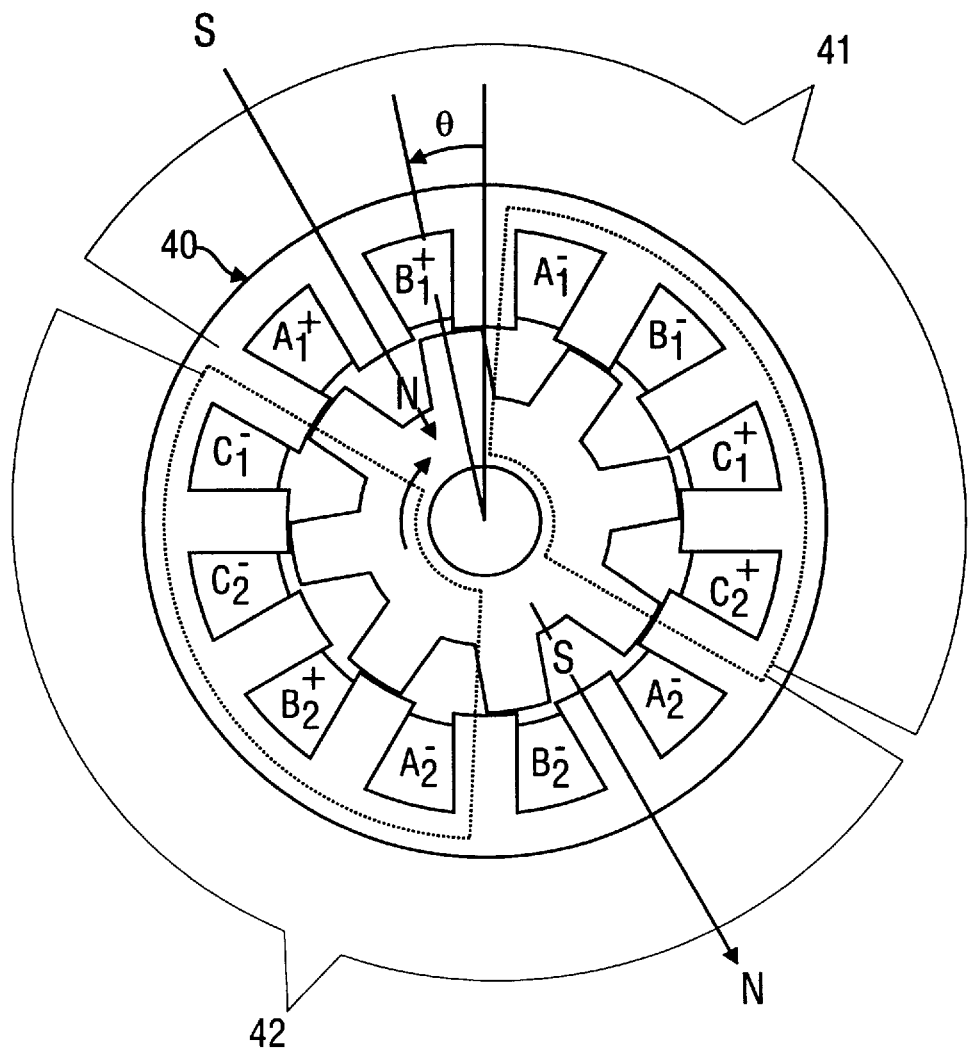

FIG. 5B illustrates the magnetic makeup of the machine when phase A is energized. As illustrated the two coils of phase A are arranged such that the magnetic fields established by each coil when positive electric current is applied to the coil are in alignment. In other words, phase A is magnetic uni-polar. This establishment of aligned magnetic fields tends to concentrate the flux along the paths marked with the dashed lines in FIG. 5B.

Figure 5C:
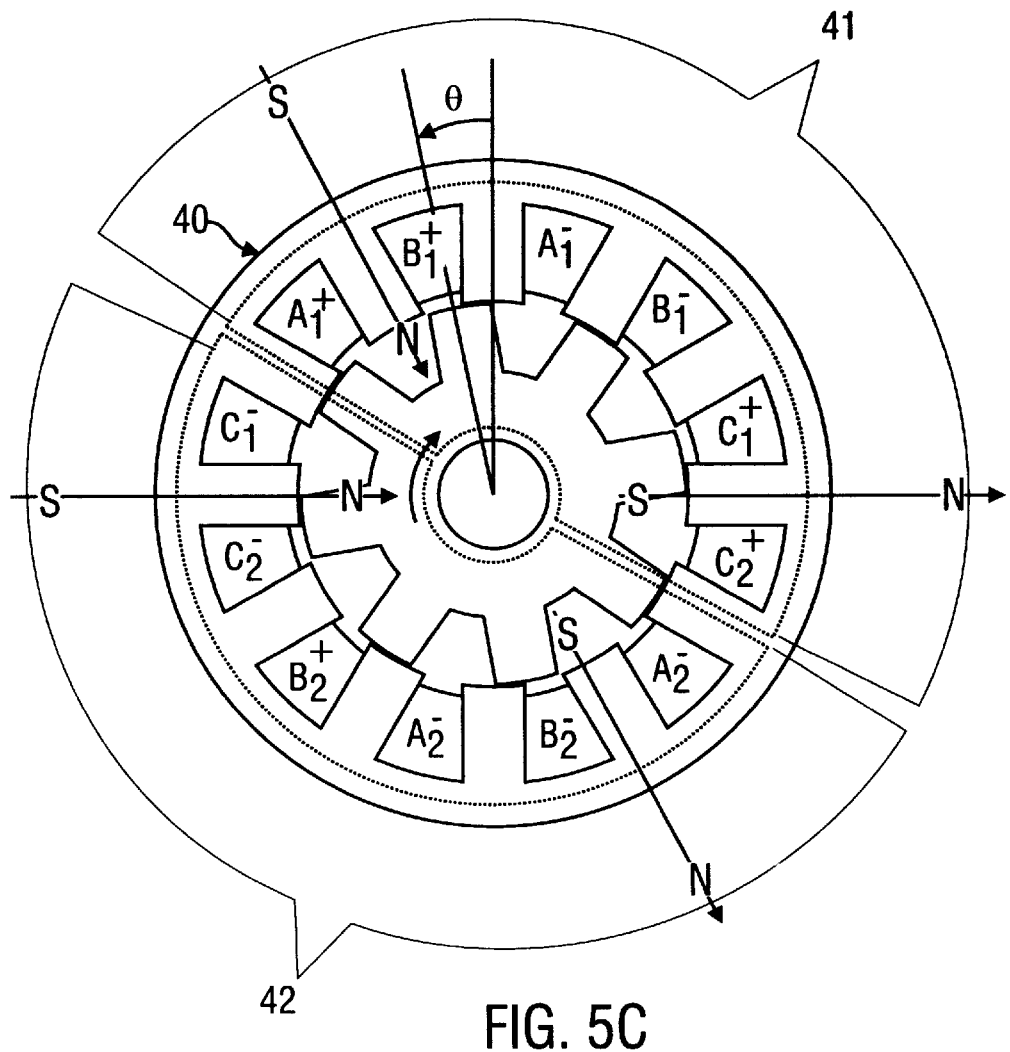

FIG. 5C illustrates the magnetic makeup of the machine 40 when both phases A and C are energized with positive current. As illustrated, each of the coils of phase C, like those of phase A, tends to establish aligned magnetic fields so as to concentrate the flux along the paths indicated by the dashed lines. Moreover, as reflected in FIG. 5C, the aligned magnetic fields established by phase C are aligned with those of phase A such that the simultaneously energization of phases A and C establishes common, aligned magnetic fields that tend to support one another and further concentrate the flux such that it follows a desirable flux-path. In particular, simultaneous energization of phases A and C tends to concentrate the flux flow through poles 50 and 51 which are common to the coils of phases A and C.

Figure 6:
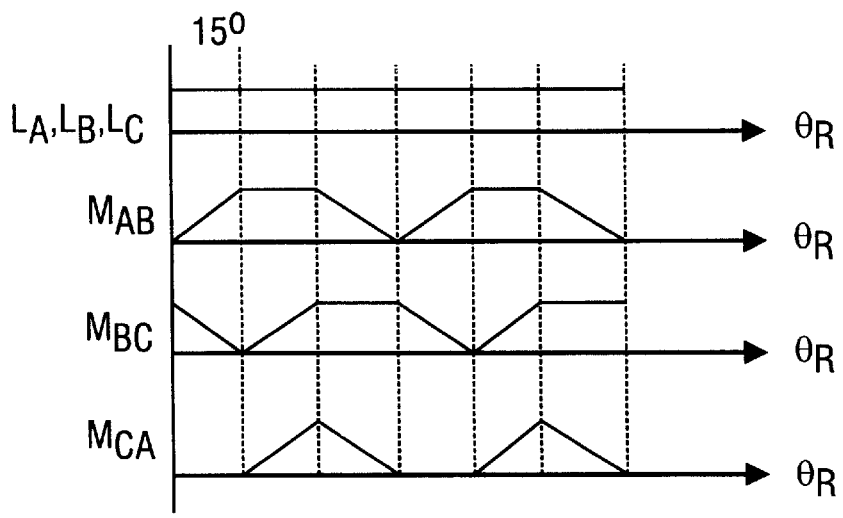
FIG. 6 illustrates the mutual and self-inductances for the machine of FIG. 5A as a function of the angular position of the rotor.

FIG. 6 illustrates the self and mutual-inductances for machine 40 as a function of rotor position. Because of the symmetric nature of machine 40 only the first 90 degrees of rotor rotation is shown, the cycle illustrated in FIG. 6 simply repeats over each 90 degrees of rotor rotation.

Figure 7B:
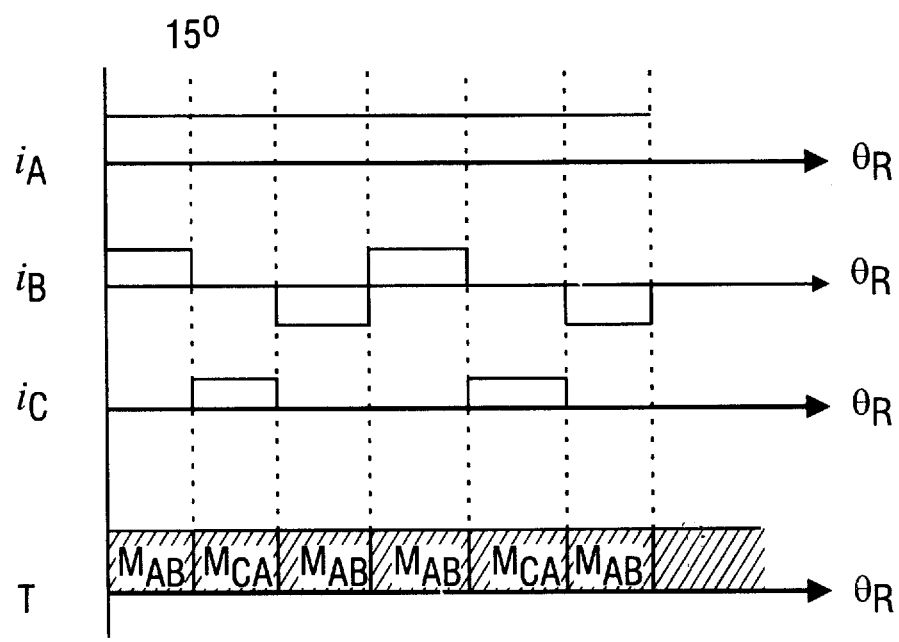

FIGS. 7A and 7B illustrate alternate energization schemes for machine 40. In both energization schemes, substantially constant Dc current is applied to the phase A winding. In the energization scheme of FIG. 7A the energization scheme is such that, for each rotor position, energization current is applied to each of the three phase windings. As reflected in FIG. 7A, in this energization scheme, at each rotor position, there are positive torque contribution resulting from the changes in the mutual-inductances between all three of the phase windings (e.g., at 0–15 degrees there is a positive torque contribution from $M_{BC}$ and a positive torque contribution from $M_{AB}$). FIG. 7B illustrates an energization scheme where, for each rotor position, only two of the three phase windings are energized. In this scheme, at each rotor position, the only positive torque contribution results from changes in the mutual-inductance between two of the phase windings. For example for the interval of 0 degrees to 15 degrees, all of the torque contribution comes from changes in $M_{AB}$.

Focusing on FIGS. 7A and 7B, it may be noted that the phase energization currents for phases B and C are not symmetric, and different from one another both in terms of current waveform and phasing. While such energization schemes can be implemented, they are not as easily implemented as energization schemes where the phase energization currents are symmetric or near-symmetric.

Figure 8:
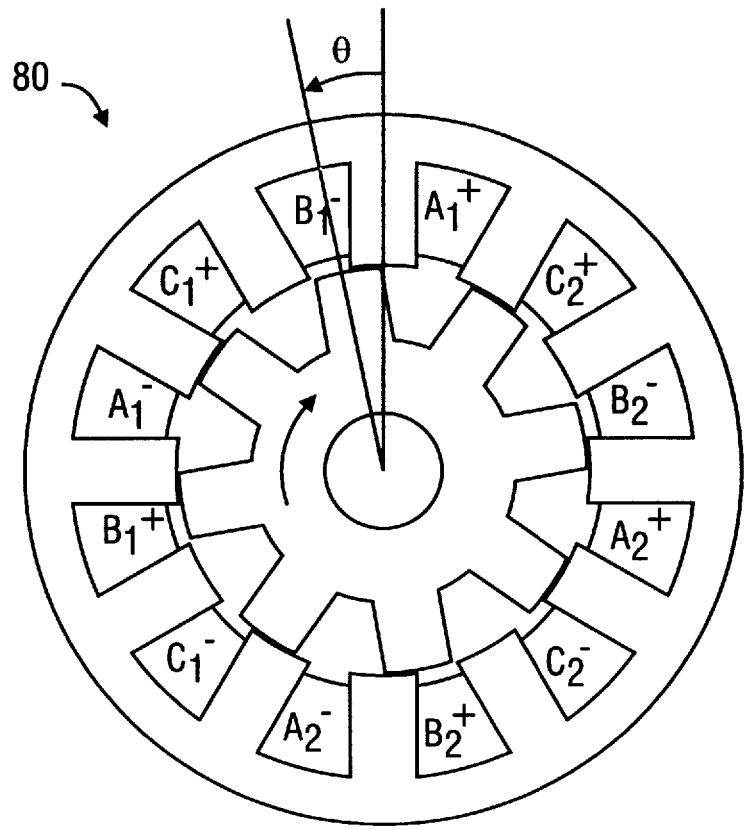
FIG. 8 illustrates an alternate embodiment of the exemplary machine of FIG. 5A which allows for the use of symmetric energization currents.
Figure 9:
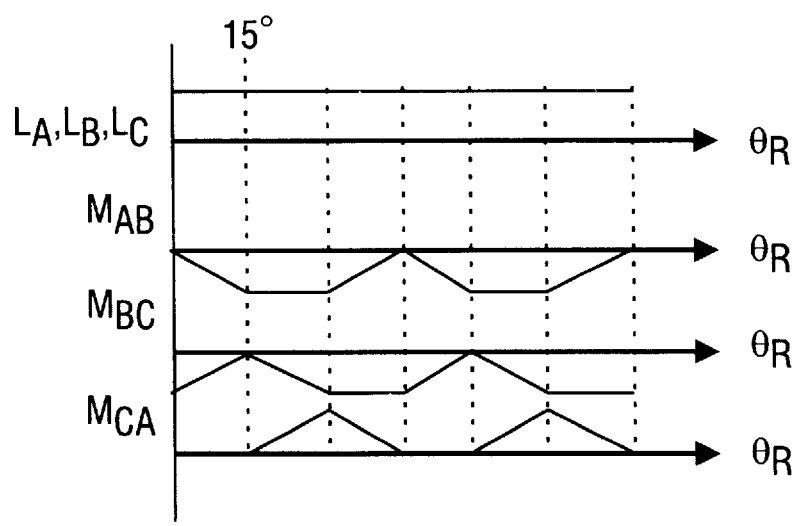
FIG. 9 illustrates the mutual and self-inductances for the machine of FIG. 8 as a function of the angular position of the rotor.

FIG. 8 illustrates a reluctance machine 80 similar to that of machine 40 of FIG. 5A with the exception that the MMF direction of one of the phases (phase B in the example) is reversed, by configuring the winding coils associated with that phase such that positive electric current flows in the direction opposite that associated with the coils for that phase in machine 40. The self- and mutual-inductances for machine 90 art illustrated in FIG. 9. Each of the three phases A, B and C in machine 80 is uni-polar.

Figure 10A:
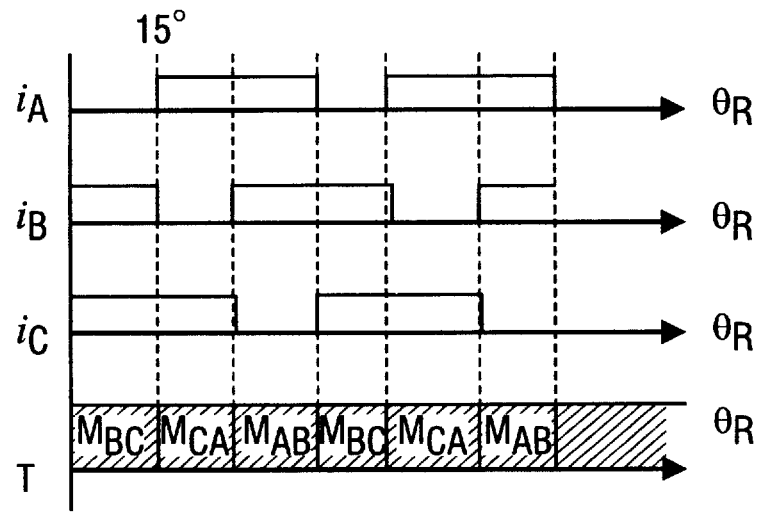
FIGS. 10A and 10B illustrate exemplary energization schemes for the machine of FIG. 8.
Figure 10B:
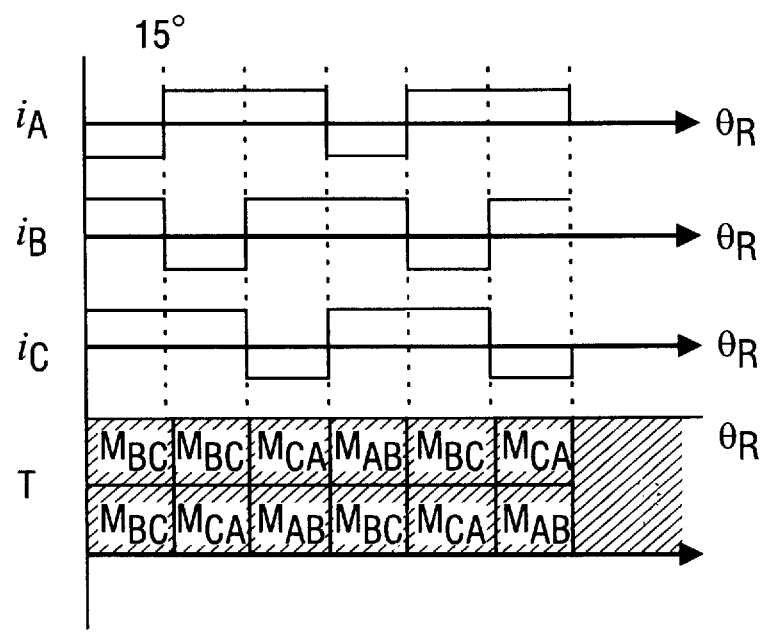

FIGS. 10A and 10B illustrate exemplary energization schemes for machine 90. In FIG. 10A, the energization currents are uni-polar. As illustrated in the exemplary energization scheme of FIG. 10A, the phase currents are all of the same form but are phase-shifted with respect to one another by 15 degrees mechanical. Thus, the energization currents for the energization scheme of FIG. 10A are symmetric. This type of energization scheme may be easily implemented through known power converters and controllers.

FIG. 10B illustrates an exemplary bi-polar energization scheme. In the illustrated scheme the energization currents of phases A, B and C are symmetric (e.g., the same but phase shifted with respect to one another). Such symmetric energization currents may be used since the changes of the mutual inductances between any two phase windings of machine 80 are symmetric. However the mutual-inductance between phase winding C and B is not symmetric with the mutual-inductance between phase winding A and C. This is because, in machine 80, phases A and B have two common stator poles—as do phases B and C—but phases A and C have only one common stator pole.

Figure 11:
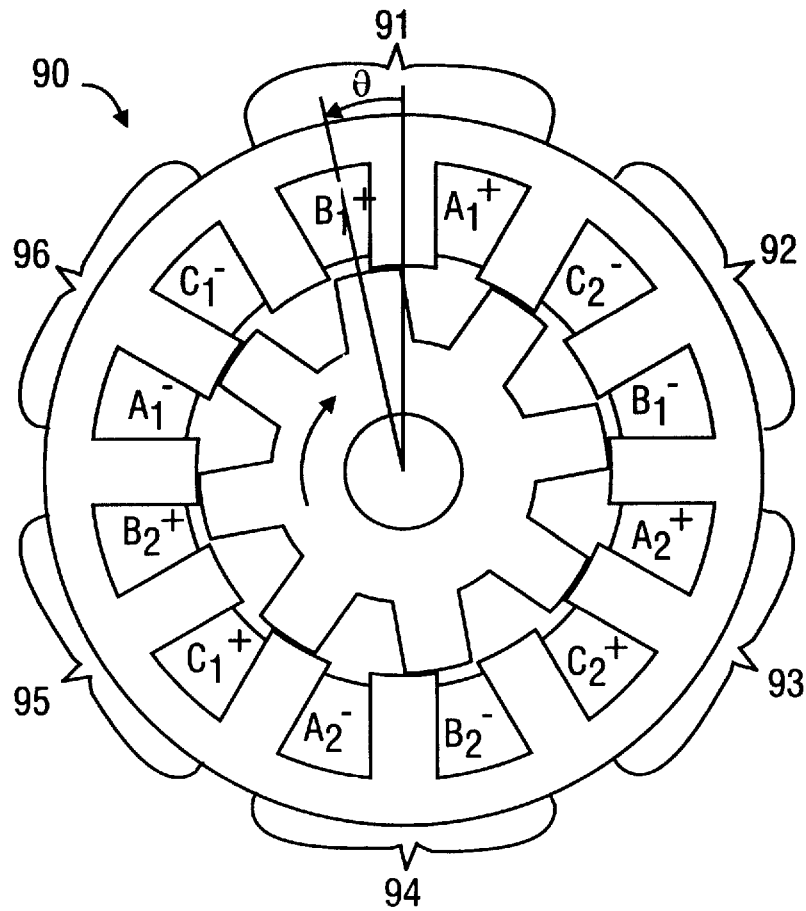
FIG. 11 illustrates an alternate embodiment of the exemplary machine of FIG. 5A wherein the mutual-inductances between the various phase windings are symmetric.

FIG. 11 illustrates a uni-polar machine 90 where only one common pole exists between any two phases.

The machine 90 of FIG. 11 is illustrated using the same conventions previously used. As illustrated, the arrangement of the coils comprising the phase winding is such that, there are six groups of adjacent stator slots, 91, 92, 93, 94, 95 and 96, where each group comprises a number of adjacent coil sides in adjacent stator slots, where the number of adjacent stator slots in the group consists of N−1 stator slots, where N is an integer equal to the number of phases. Thus, in the example of FIG. 11, there are two adjacent slots in each group.

As reflected in FIG. 11, the direction of the current flowing in each group alternates around the stator such that there is a first group of adjacent stator slots including adjacent slots 91, 93 and 95 that conduct positive current in a first direction and a second group of adjacent stator slots 92, 94 and 96 that conduct current in a second direction opposite to the first direction. Thus, with N being an integer equal to the number of phases, there are N first groups of adjacent stator slots for which positive electric current applied to the coil sides positioned in the first group of stator slots flows in a first direction and N second groups of adjacent stator slots for which positive electric current applied to the coil sides positioned in the second group of stator slots flows in a second direction, wherein the first direction is opposite the second direction.

Figure 12:
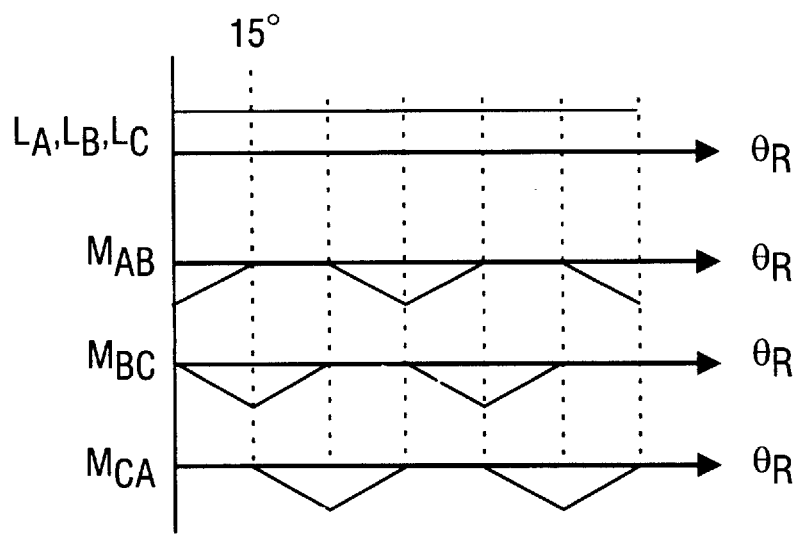
FIG. 12 illustrates the mutual and self-inductances for the machine of FIG. 8 as a function of the angular position of the rotor.

FIG. 12 illustrates the self and mutual-inductances of the machine 90. As illustrated, all three of the mutual-inductance waveforms are symmetric with respect to one another.

Figure 13A:
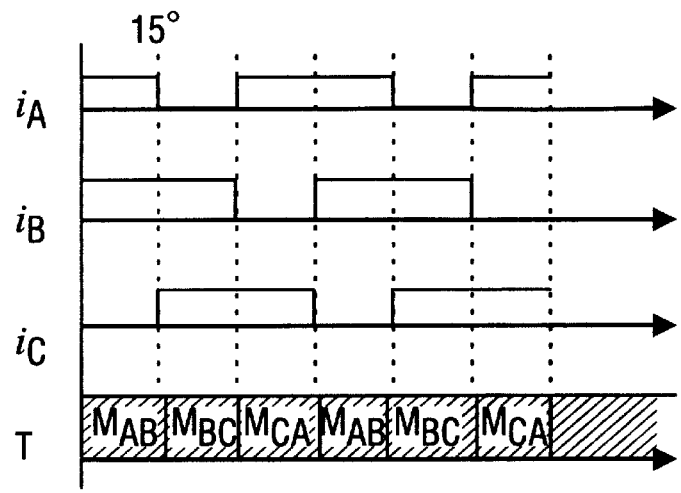
FIGS. 13A and 13C illustrate exemplary energization schemes for the machine of FIG. 11.
Figure 13B:
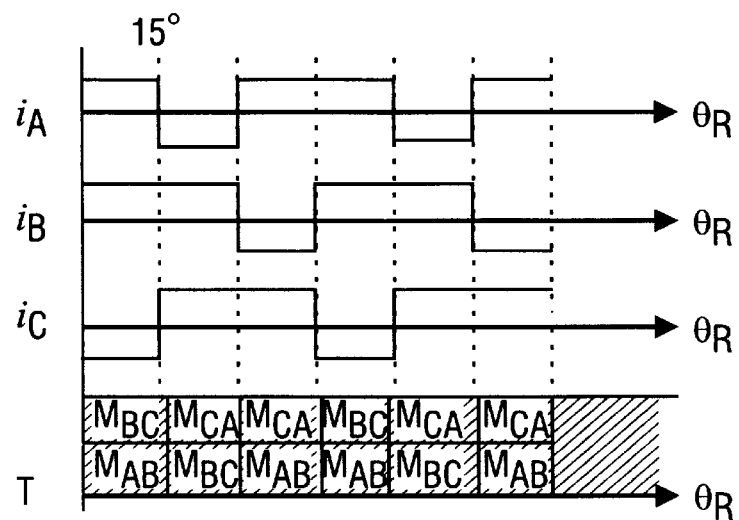
Figure 13C:
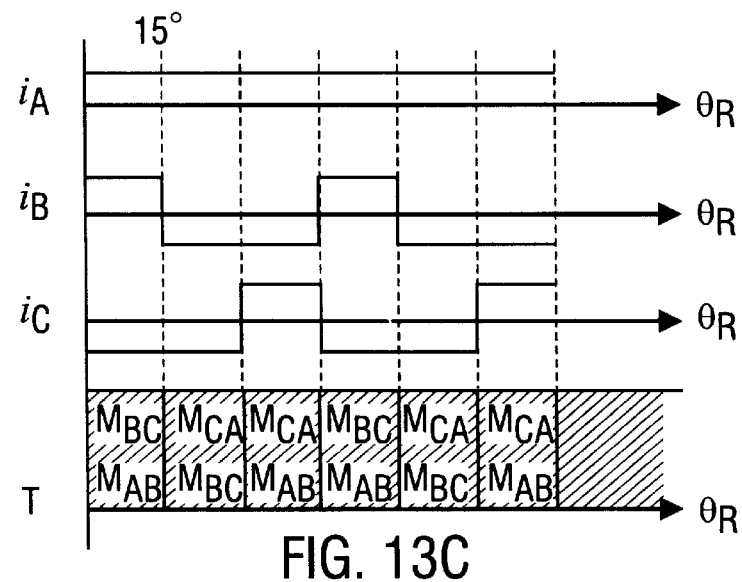

FIGS. 13A–13C illustrate three energization schemes for machine 90 where, for FIG. 13A, uni-polar excitation currents are used; for FIG. 13B, bipolar currents are used; and for FIG. 13C, one DC current is used. The net output torque, as a result of either one mutual-inductance variation or two mutual-inductance variations, is also shown approximately by the hatched region of the figures.

The above description of several exemplary embodiments is made by way of example and not for purposes of limitation. Many variations may be made to the embodiments and methods disclosed herein without departing from the scope and spirit of the present invention. For example, the present invention was discussed in the context of a twelve stator pole, eight rotor pole machine having three phase windings. Alternate stator pole/rotor pole combinations (e.g., 6/4, 8/4, etc.) and various combinations of coil connections, placement and sequence of each phase winding to provide the described MMF patterns, are envisioned, as are alternate phase combinations (two phase, four phase, etc.), and the use of such alternate configurations will not depart from the scope of the present invention.

Additionally, the present invention may be used in many applications including industrial applications, specialty applications, appliance applications, aerospace applications, and automotive applications. The present invention may also be used in power generation applications including stand-alone generators and/or grid-connected generators. The use of the present invention in the above described or other applications shall not depart from the scope and spirit of the present invention. The present invention is intended to be limited only by the scope and spirit of the following claims.

What is claimed is:

1. A reluctance machine comprising:
   a stator defining a plurality of stator poles and a plurality of stator slots;
   a rotor positioned to rotate with respect to the stator; and
   at least three phase windings, where each phase winding comprises a plurality of coils, where each coil is wound about more than one stator pole, where each coil comprises two coilsides, and where only one coil side is positioned in each stator slot;
   wherein the number of stator poles encircled by each coil of at least two of the phase windings is less than the total number of phase windings such that the self-inductance of each phase winding varies as a function of the angular position of the rotor with respect to the stator.

2. The reluctance machine of claim 1 wherein, for at least one phase winding, the coils comprising the one phase winding are arranged such that, when positive current is flowing through the phase winding, diametrically opposed poles having opposite magnetic polarity are established.

3. The reluctance machine of claim 1 wherein there are N phase windings, and N is an integer, and N−1 of the phase windings include coils that are wound about N−1 stator poles.

4. The reluctance machine of claim 1 wherein the phase windings are positioned within the stator such that there is a first group of adjacent stator slots containing coil sides for which positive electric current applied to the coil sides positioned in the first group of stator slots flows in a first direction and a second group of adjacent stator slots containing coil sides for which positive electric current applied to the coil sides positioned in the second group of stator slots flows in a second direction, wherein the first direction is opposite the second direction.

5. The reluctance machine of claim 4 wherein there are Y stator slots, Y being an integer, and wherein the first group of adjacent stator slots includes Y/2 stator slots.

6. A reluctance machine comprising:
   a stator defining a plurality of stator poles and a plurality of stator slots;
   a rotor positioned to rotate with respect to the stator; and
   a plurality of phase windings, where each phase winding comprises a plurality of coils, where each coil is wound about more than one stator pole, where each coil comprises two coil sides, and where only one coil side is positioned in each stator slot;
   wherein the self-inductance of each phase winding varies as a function of the angular position of the rotor with respect to the stator;
   wherein, for at least one phase winding, the coils comprising the one phase winding are arranged such that energization of the at least one phase winding establishes diametrically opposing poles having opposite magnetic polarity;
   wherein there are N phase windings, and N is an integer, and N−1 of the phase windings include coils that are wound about N−1 stator poles; and
   wherein one of the phase windings includes coils that are wound about 2N−1 stator poles.

7. A reluctance machine comprising:
   a stator defining a plurality of stator poles and a plurality of stator slots;
   a rotor positioned to rotate with respect to the stator; and
   phase winding means positioned within the stator for establishing diametrically opposed poles having opposite magnetic polarity when the phase winding means is energized, the phase winding means comprising at least three phase windings, where each phase winding comprises a plurality of coils, where each coil is wound about more than one stator pole, where the number of stator poles encircled by each coil of at least two phase windings is less than the total number of phase windings; and where each coil comprises two coil sides, and where only one coil side is positioned in each stator slot.

8. A method of operating a reluctance machine comprising a stator defining a plurality of stator poles and a plurality of stator slots; a rotor positioned to rotate with respect to the stator; a plurality of first phase windings, where each first phase winding comprises a plurality of first coils, where each first coil is wound about more than one stator pole, wherein the number of stator poles encircled by each first coil is less than the number of phase windings such that the self-inductance of each phase winding varies as a function of the angular position of the rotor with respect to the stator; and a second phase winding comprising at least one second coil encircling a plurality of stator poles, wherein the number of stator poles encircled by the second coil is greater than the number of phase windings, the method comprising the steps of: energizing the second phase winding with substantially constant current of a given polarity; and commutating the current in at least one of the first phase windings at the point where the self-inductance of that phase winding is near its minimum value.

9. A reluctance machine comprising:

a stator defining a plurality of stator poles and a plurality of stator slots;

a rotor positioned to rotate with respect to the stator; and

N phase windings, where N is an integer, where each phase winding comprises a plurality of coils, where each coil is wound about N stator poles, where each coil comprises two coil sides, and where only one coil side is positioned in each stator slot;

wherein energization of each of the phase windings establishes diametrically opposing poles of opposite magnetic polarity;

and wherein there are first, second and third phases and wherein there are two common stator poles between the coils of the first and second and first and third phases and one common stator pole between the coils of the second and third phases.

* * * * *